United States Patent
Bir et al.

(10) Patent No.: US 11,079,810 B2
(45) Date of Patent: Aug. 3, 2021

(54) FLEXIBLE CABLE DURABILITY

(71) Applicant: Apple Inc., Cupertino, CA (US)

(72) Inventors: Karan Bir, Cupertino, CA (US); Adam T. Garelli, Morgan Hill, CA (US); Bryan W. Posner, San Francisco, CA (US); Denis H. Endisch, Cupertino, CA (US); Simon R. Lancaster-Larocque, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/444,764

(22) Filed: Jun. 18, 2019

(65) Prior Publication Data

US 2020/0401195 A1    Dec. 24, 2020

(51) Int. Cl.
*G06F 1/16* (2006.01)
*E05D 11/00* (2006.01)

(52) U.S. Cl.
CPC .......... *G06F 1/1683* (2013.01); *E05D 11/00* (2013.01); *E05D 11/0081* (2013.01); *G06F 1/1616* (2013.01); *G06F 1/1637* (2013.01); *E05Y 2800/43* (2013.01); *E05Y 2900/606* (2013.01)

(58) Field of Classification Search
CPC .... G06F 1/1683; G06F 1/1637; G06F 1/1616; E05D 11/0081; E05D 11/00; E05Y 2800/43; E05Y 2900/606
See application file for complete search history.

(56) References Cited

U.S. PATENT DOCUMENTS

| | | | | |
|---|---|---|---|---|
| 4,885,430 A | * | 12/1989 | Kinser, Jr. ............ | H01H 13/702 361/749 |
| 4,959,887 A | * | 10/1990 | Gruenberg ............ | G06F 1/1616 16/223 |
| 5,177,672 A | * | 1/1993 | Ito ......................... | G06F 1/1616 361/741 |
| 5,253,142 A | * | 10/1993 | Weng ...................... | E05C 19/06 16/223 |
| 5,390,075 A | * | 2/1995 | English ................. | G06F 1/1616 16/386 |
| 5,394,297 A | * | 2/1995 | Toedter ................. | G06F 1/1616 16/386 |

(Continued)

FOREIGN PATENT DOCUMENTS

JP    2009186006 A    8/2009
JP    2018521384 A    8/2018

*Primary Examiner* — Adrian S Wilson
*Assistant Examiner* — Theron S Milliser
(74) *Attorney, Agent, or Firm* — Dorsey & Whitney LLP

(57) ABSTRACT

Apparatuses and systems can mitigate the ingress of debris such as small foreign particles or fluids passing into a joint of an electronic device. Some aspects of the systems prevent particles from passing between a flexible cable and a mandrel surface used to limit bending of the cable. Other aspects provide particle relief features including gaps, grooves, or reduced-size sections of the mandrel so that particles can pass into them and thereby cause no damage or pass out of the electronic device. Another aspect provides a protective layer configured to limit pressure applied to the cable by particles or other contaminants. These apparatuses and systems can improve the life and durability of the mandrel and cable, thereby improving the reliability of operating the electronic device.

18 Claims, 5 Drawing Sheets

(56) References Cited

U.S. PATENT DOCUMENTS

| | | | | |
|---|---|---|---|---|
| 7,253,774 | B2* | 8/2007 | Kasamatsu | G06F 1/1605 |
| | | | | 343/702 |
| 8,593,800 | B2* | 11/2013 | Asakura | G06F 1/1616 |
| | | | | 16/235 |
| 9,891,672 | B2* | 2/2018 | Hampton | G06F 1/1681 |
| 10,185,355 | B2* | 1/2019 | Watamura | G06F 1/1681 |
| 10,635,141 | B2* | 4/2020 | Silvanto | E05D 11/0054 |
| 2004/0264118 | A1* | 12/2004 | Karidis | G06F 1/1683 |
| | | | | 361/679.55 |
| 2013/0058048 | A1* | 3/2013 | Choi | G06F 1/1681 |
| | | | | 361/727 |
| 2015/0049275 | A1* | 2/2015 | Posner | G06F 1/1637 |
| | | | | 349/42 |
| 2016/0014915 | A1* | 1/2016 | Posner | G06F 1/1616 |
| | | | | 361/679.55 |
| 2016/0327993 | A1* | 11/2016 | Garelli | G06F 1/1637 |
| 2018/0113493 | A1* | 4/2018 | Silvanto | E05D 11/1028 |

* cited by examiner

FLEXIBLE CABLE DURABILITY

FIELD

The described embodiments relate generally to cable assemblies for electronic devices. More particularly, the present embodiments relate to routed cable assemblies through hinged sections of electronic devices.

BACKGROUND

Many consumer electronic devices have multiple housing sections. Often, electronic signals must be sent from one housing section to another housing section. Electronic devices may have electronics in one housing section that receive a signal from another housing section. For example, a laptop computing device may have a display mounted in a display housing section that receives signals from a timing controller mounted in another housing section. The display housing section may also rotate or be movable in relation to another housing section through a hinge. For example, many laptop computers have a display housing section that rotates around a hinge assembly to facilitate viewing of the display at various viewing angles and to allow access to user input controls located on a main housing assembly.

One challenge associated with a hinged electronic device enclosure is securely routing a signal from one housing section to another housing section. Some electronic devices route a signal transfer mechanism, such as a flexible ribbon-like cable, around the hinge mechanism or through a center hole in a clutch assembly of the hinge. However, these cables must be protected from exposure to users and from over-bending caused by the actuation of the clutch assembly, hinge mechanism, and relative movement of other computer components. As electronic devices get smaller and thinner, the amount of space available for clutch assemblies, hinges and cables is constrained, making it more difficult to provide room for and properly protect the cables. There is therefore a constant need for improvements to cables and hinge assemblies for electronic devices.

SUMMARY

An aspect of the present disclosure relates to a portable computing device, which can comprise an upper housing portion containing a first electronic component, with the upper housing portion having a curved surface. The device can also comprise a lower housing portion pivotally connected to the upper housing portion by a hinge, with the lower housing portion containing a second electronic component and with the upper and lower housing portions being relatively pivotable between an open position and a closed position. A cable can connect the first and second electronic components, with the cable being bendable along the curved surface when the upper and lower housing portions are in the open position. A particle relief feature can be positioned between the hinge and the cable to reduce pressure applied to the cable by a particle positioned between the cable and the curved surface.

In some embodiments, the particle relief feature can comprise a set of channels recessed into the curved surface or a gap between the curved surface and the cable when the upper and lower housing portions are in the closed position. The particle relief feature can comprise a barrier contacting the curved surface. The barrier can be rotatable with the curved surface or slidable against the curved surface as the upper and lower housing portions are pivoted between the open and closed positions. The particle relief feature can comprise a material that is relatively rigid in bending along a width dimension of the cable and that is relatively flexible in bending along a length dimension of the cable.

Another aspect of the disclosure relates to a laptop computer comprising a housing having a display portion and a base portion, with at least one of the display and base portions having a mandrel surface, an electronic display in the display portion of the housing, a set of computing components in the base portion of the housing, and a cable connecting the set of computing components and extending between the electronic display and the set of computing components, with the cable being bendable over the mandrel surface and with the mandrel surface being at least partially spaced away from the cable when the display portion and the base portion are in an open position.

In some embodiments, the mandrel surface can comprise a set of channels. The mandrel surface can be at least partially spaced away from the cable within one of the channels of the set of channels. The set of channels can be oriented parallel to a length dimension of the cable. The mandrel surface can comprise multiple different radii, with the multiple different radii being measured from a mandrel surface pivot axis. In some arrangements, each of the multiple different radii are perpendicular to the cable at different points of rotation of the mandrel surface about the mandrel surface pivot axis. The multiple different radii can comprise a first radius and a second radius, with the first radius being smaller than the second radius and with the first radius being positioned at a top end of the mandrel surface when the display portion and the base portion are in a closed position. The mandrel surface can at least partially touch the cable when the display portion and the base portion are in the open position. The mandrel surface can be at least partially spaced away from the cable when the display portion and the base portion are in a closed position.

Yet another aspect of the disclosure relates to a computing device comprising a first housing assembly having a mandrel, with the mandrel having a curved surface, a second housing assembly movably connected to the first housing, and a cable extending between the first and second housing assemblies, with the cable being at least partially wrappable around the curved surface as the first and second housings move relative to each other. The mandrel can comprise a debris relief portion to block or capture debris between the curved surface and the cable.

The debris relief portion can comprise a recess in the mandrel to collect debris between the mandrel and the cable. The debris relief portion can also comprise a reduced radius portion of the curved surface or a compressible barrier. The debris relief portion can be configured to primarily distribute force concentrations caused by debris positioned between the curved surface and the cable along a distribution axis, with the distribution axis being parallel to an axis of rotation of the first housing assembly relative to the second housing assembly. These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
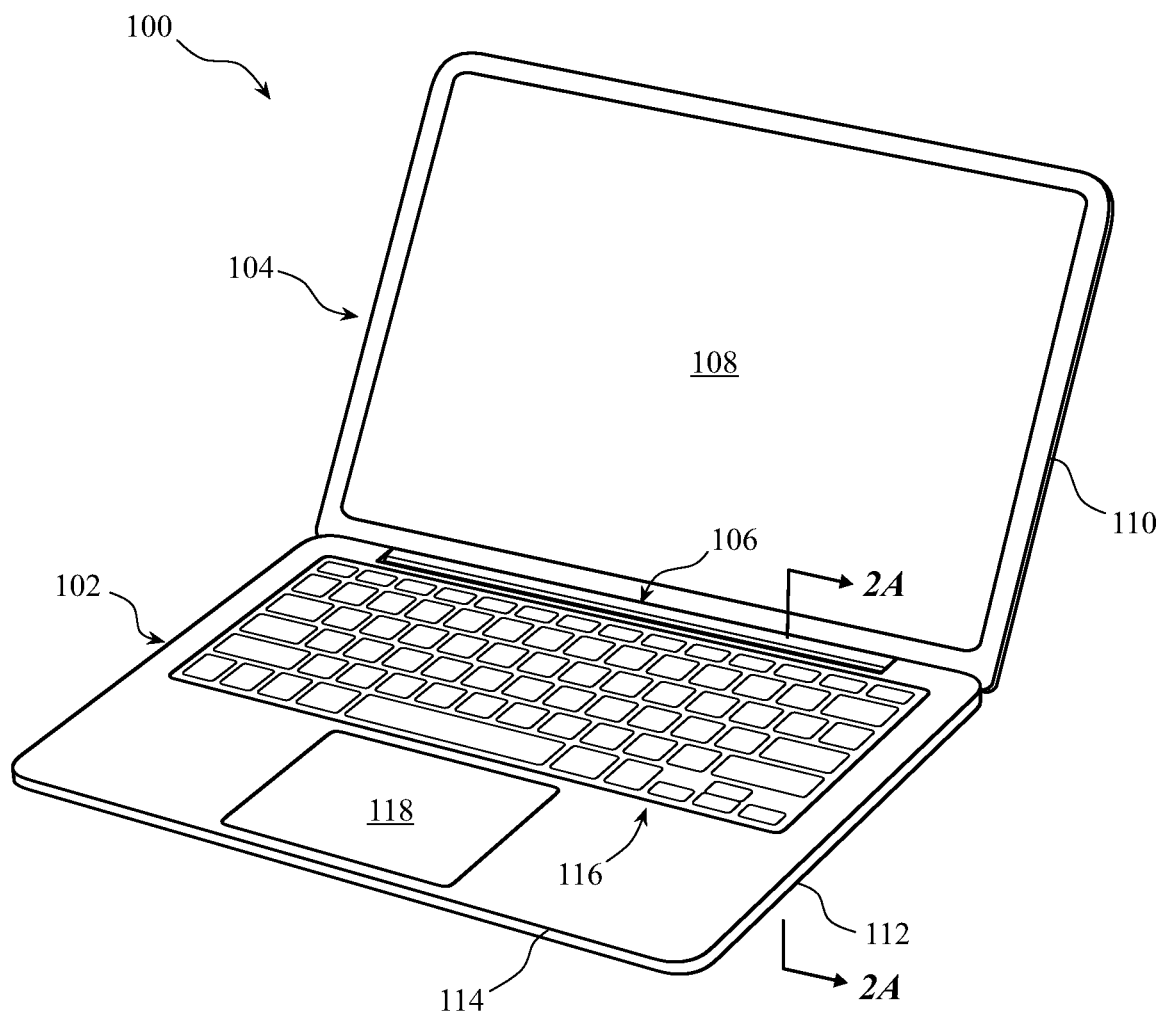
FIG. 1 shows an isometric view of a computing device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Hinged electronic devices can have one or more cables connecting the parts of the devices through or across their hinges. In particular embodiments, the cables include a flex cable and/or a flexible printed circuit board appropriate for transmitting an electrical signal between portions of an electronic device that are connected by a hinge. In the case of a portable computing device (e.g., a laptop computer or notebook computer), one portion of the electronic device may correspond to a lid portion having a display and another portion may correspond to a base portion that includes electronics in communication with the display via the cable(s). The cable(s) can be routed through a hinge region to transmit electrical signals between components within the lid and base portions.

In some embodiments, the cable is drawn over a section of the lid portion referred to as a mandrel or a mandrel portion. The mandrel can be configured to guide the path of the cable and protect the cable from bending beyond a prescribed angle as the lid portion and base portion of the computer pivot relative to each other. In particular embodiments, the mandrel has a curved surface to provide smooth movement of the cable and to limit cable bending. This surface can be referred to as a mandrel surface or a cable contacting surface. In some embodiments, the mandrel surface has a constant radius (as measured from the pivot axis) against which the cable is drawn. In some embodiments, the radius varies as the cable is drawn over the mandrel or the radius is different at different points of contact on the mandrel.

In further embodiments, a cover is drawn over the cable in order to prevent the cable from being directly exposed to a user of the electronic device. In some embodiments, the cover can be a sheet of material or materials having particular physical properties, such as a certain rigidity and resilience that allows for a prescribed movement of the cover and the cable when the electronic device moves between open and closed positions. The cover can also have sufficient durability to withstand wear and tear during the service life of the electronic device. The cover can have multiple layers of material in order achieve these and other desirable physical properties. The rigidity of the cover can allow the lid portion to drive the cover into a cavity defined by the base portion of the electronic device. In some embodiments, the cover can be visible to a user of the electronic device.

In some embodiments, the cable is coupled to an electronic component within the base portion of the electronic device. The cable can be attached to electronics such as an integrated circuit or printed circuit board with timing control suitable for driving a display assembly. The cable may be circumferentially routed around a support member located within the base portion in a wrapped configuration. A clip located on the guiding member can secure the cable, isolating one or more sections of the cable that attaches to the electronic component and preventing movement of portions of the cable when the lid portion is rotated relative to the base portion. The other end of the cable can be coupled to an electronic component, such as a display assembly, within the lid portion. In some embodiments, the electronic component in the lid portion can be a touchscreen panel (e.g., a capacitive or resistive touchscreen display), a camera, a light source, an antenna, or another type of electronic component, and the cable can be configured to provide electrical communication between a component of the base portion and the component of the lid portion. Accordingly, the electronic component in the lid portion does not necessarily need to be a display, and the cable may carry signals different from, or in addition to, display driving signals.

The mandrel can be part of a hinge mechanism and can include a cylindrical shaft, a tubular shaft, a pivot and/or swivel mechanism, or a slider mechanism. In some devices, the cable and the curved surface of the mandrel come into close proximity as the electronic device is used, such as when the cable wraps against or otherwise moves into contact with the curved surface. Portions of the mandrel can be positioned lateral to the curved surface, such as portions that are positioned at different points along the pivot axis of the electronic device, and they can be out of contact with, or not covered by, a flex cable or cover.

The devices can also have a vent opening or gap between the lid and base portions of the housing. When dust and other foreign debris or particulate matter passes through the gap, it can become trapped or lodged in a crevice between the mandrel-facing surface of the cable and the curved surface of the mandrel. If not mitigated, these particles can apply pressure to the cable and mandrel in a manner that undesirably and negatively affects cable and mandrel performance, such as by penetrating, rubbing, or scratching the cable in a manner that can cause premature failure and fraying. Frequent and repeated rotation between the first portion and the second portion of the hinged electronic device can further exacerbate the damage to the cable when the particles protrude against these components. Examples of such foreign particles can include sand, sugar, salts, debris, and other similar particles encountered during normal use of electronic device. In some cases, particles have hard and sharp surfaces, and are generally not very deformable. In some cases, the particles can range in size between about 10 micrometers to about 1 millimeter in size.

Accordingly, aspects of the present disclosure relate to features for relieving pressure on cables that is caused by the presence of foreign particles, removing foreign particles from sensitive areas of the electronic device, and preventing foreign particles from entering those sensitive areas. In some embodiments, the mandrel can have a curved surface with a set of channels or grooves formed therein and configured to allow particles positioned between the cable and curved surface to be lodged in or pass through the channels. Thus, the particles can be trapped in a position where they apply little or no pressure to the cable, or they can pass to a position where they can exit the electronic device.

In some embodiments, the curved surface of the mandrel can have a variable surface curvature and multiple radii from the axis of rotation so that a gap can form between the cable and the curved surface when the electronic device is in at least one open or closed configuration. The formation of the gap can allow particles trapped between the cable and the curved surface to be loosened or drop away from the cable and out of the device when the device is in the predetermined configuration. The curvature can also include a support portion configured to contact the cable and limit cable bending when the electronic device is in at least one of the open or closed configurations. The variable surface curvature can be configured so that the gap is positioned where the highest pressure would be applied by a particle or at a deep position relative to a particle ingress point (i.e., where particle removal would be the most difficult and unlikely to happen automatically due to the size of the crevice or the amount of pressure applied to the cable by a particle in that spot). Thus, movement of the mandrel to a first position provides an open space between the cable and the curved surface, and movement of the mandrel to a second position provides contact (or an increased surface area of contact) between the cable and the curved surface.

In some embodiments, a flexible barrier is provided in the electronic device that physically prevents ingress of particles between the cable and the curved surface. The barrier can be attached to the curved surface or to the cable and can be compressible in a manner that limits the amount of pressure it applies to the cable if it is compressed between the cable and mandrel during movement of the curved surface. The barrier can also comprise a flexible tape or similar layer of material positioned between the curved surface and the cable that has directional rigidity. The flexible tape can have a composite construction that axially distributes force concentrations caused by foreign particles and therefore reduces local forces applied to the cable.

The cable assemblies and structures described herein can be integrated into consumer products. For example, the cable assemblies and structures described herein can be used in electronic devices, such as computers, portable electronic devices, wearable electronic devices and electronic device accessories, such as those manufactured by Apple Inc., based in Cupertino, Calif.

In the description below, the terms "first portion," "display portion," and "upper housing portion" can refer to a lid portion of a computing device. Generally, a lid portion of a computing device is configured to be in a generally upright position for a user to view a display while the device is being operated. In the description below, the terms "second portion," "base portion," and "lower housing portion" can refer to a base of a computing device that is connected to the lid portion and generally includes connections to devices for user interaction with the computing device. Furthermore, in the description below, the terms "lower housing portion" can be interchangeable with "main housing."

These and other embodiments are discussed below with reference to the figures. However, those skilled in the art will readily appreciate that the detailed description given herein with respect to these Figures is for explanatory purposes only and should not be construed as limiting.

FIG. 1 shows a front-facing perspective view of an electronic device 100 in accordance with some embodiments. Electronic device 100 can be a laptop computer, notebook computer, or other similar portable computing device. Electronic device 100 can include a housing having a base portion 102, which can be pivotally connected to a lid portion 104 by way of hinge assembly within hinge region 106. Lid portion 104 and base portion 102 can be referred to as different sections or portions of a housing of electronic device 100. Lid portion 104 can pivot with respect to base portion 102 with the aid of a hinge assembly within hinge region 106 from a closed position to remain in an open position and back again. In the closed position, the lid portion 104 can be positioned substantially on top of and parallel to the top case 114 of the base portion 102.

The lid portion 104 can include a display 108 and a rear housing or rear cover 110. The base portion 102 can include a bottom case 112 that is fastened to a top case 114. The top case 114 can be configured to accommodate various user input devices such as a keyboard 116 and a touchpad 118, which can be configured to receive finger gesturing input from a user. Base portion 102 and lid portion 104 can each define internal chambers or cavities that house internal components of electronic device 100. Thus, lid portion 104 and base portion 102 can function as housings for internal components. Cables, such as flex cables (see FIGS. 2A-2B), can electrically couple internal components within base portion 102 and lid portion 104. The cables can provide communication between the internal components within base portion 102 and lid portion 104 and/or provide power to internal components within base portion 102 and/or lid portion 104.

Cable assemblies are described herein that can be used in conjunction with hinged electronic devices, such as electronic device 100. The cable assemblies can include covers that protect and guide the cables during movement of the hinged electronic devices. In some embodiments, the covers are visible to a user of the electronic device. For instance, the covers can be visible at the hinge region 106 of the electronic device 100.

Figure 2A:
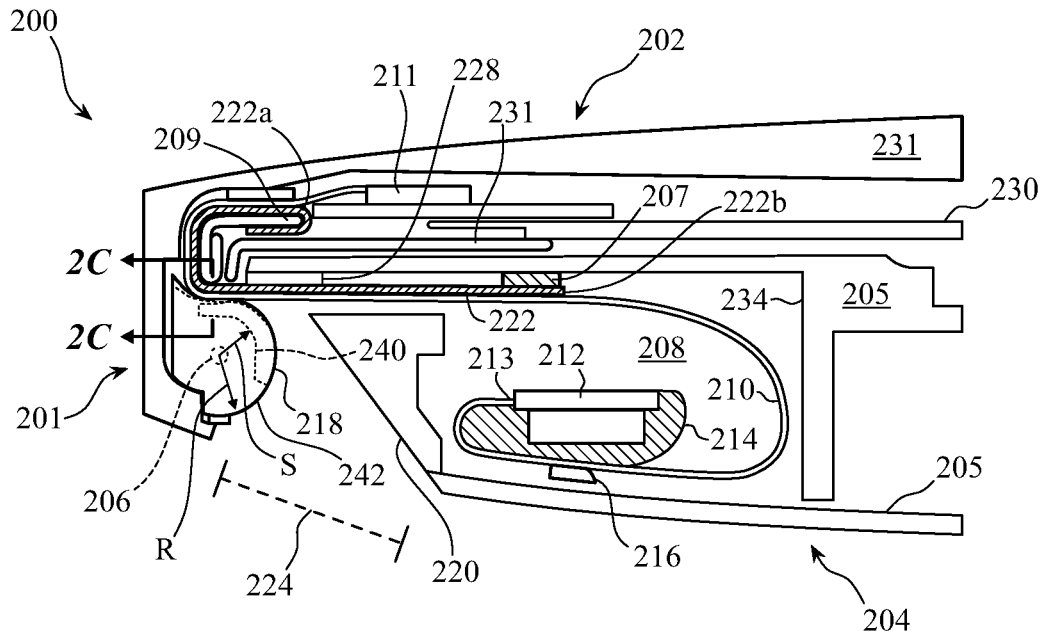
FIG. 2A shows a side section view of a hinge region of a closed computing device of FIG. 1 as taken through section lines 2-2 in FIG. 1.
Figure 2B:
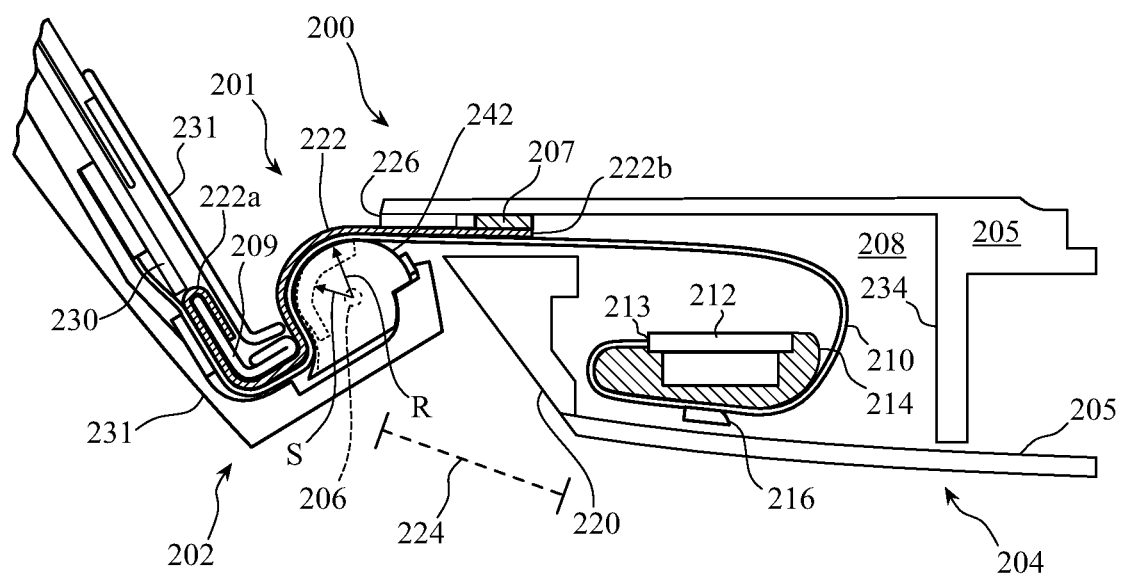
FIG. 2B shows a side section view of the hinge region of FIG. 2A with the computing device in an open configuration.

FIGS. 2A and 2B show cross-sectional views of a hinged electronic device 200. The section views are taken along section line 2A-2A in FIG. 1. FIG. 2A shows a cross sectional view of electronic device 200 in a closed state and FIG. 2B shows a cross sectional view of electronic device 200 in an open state. Electronic device 200 includes a first portion 202 (i.e., first housing portion) coupled to a second portion 204 (i.e., second housing portion). First portion 202 can correspond to a lid portion (or display portion or upper housing portion) and second portion 204 can correspond to a base portion (or lower housing portion) of electronic device 200.

First portion 202 and second portion 204 can share a common axis of rotation with respect to pivot line or pivot axis 206. First portion 202 and second portion 204 can be pivotally coupled to each other via a suitable hinge mechanism. For example, the hinge mechanism can include one or more clutch mechanisms that provide a predetermined resistance to opening and closing forces applied by a user and by the weight of the portions 202, 204 of the electronic device 200. The exact hinge mechanism may vary depending on design requirements. The general region around pivot axis 206 can be referred to as a hinge region 201 of electronic device 200.

Electronic device 200 includes cable 210 to provide electrical communication between first portion 202 and second portion 204. For example, cable 210 can provide electrical connection between electronic component 211 of first portion 202 and electronic component 212 of second portion 204. Electronic component 211 can be in electrical communication with display assembly 230, which is mounted on first housing 231. Display assembly 230 can include any suitable type of display for use in electronic device 200, such as a liquid crystal display (LCD) and/or organic light-emitting diode (OLED) screen. The first housing 231 and its attached components (e.g., display assembly 230 and mandrel 218) can be referred to as a first housing assembly.

Electronic component 212 can include an integrated circuit and/or a printed circuit board, and can include a timing control mechanism configured to drive display assembly 230. Electronic component 212 is housed within cavity 208 defined by second housing 205. In some embodiments, cable 210 provides power from a battery (not shown) within second housing 205 to display assembly 230. The second housing 205 and its attached components (e.g., electronic component 212 or the battery) can be referred to as a second housing assembly. The first and second housing assemblies are movably connected to each other at the hinge region 201.

Cable 210 can be any suitable type of cable, including a flex cable, a flexible printed circuit board, or any suitable mechanism for transmitting an electrical signal between the portions 202 and 204. In some embodiments the cable 210 is a ribbon-like, single-layer flex cable, however a multiple-layered flex cable can be used. A single-layer flex cable 210 can be used to reduce the stack height (i.e., vertical thickness) of the cable 210. Electronic device 200 can include any suitable number of cables 210. In a particular embodiment, electronic device 200 includes two, laterally spaced cables 210.

The cable 210 can be directly routed between first portion 202 and second portion 204 without passing through a clutch mechanism and without passing through the pivot axis 206. Thus, a number of mechanisms can be used to guide the movement of cable 210 when first portion 202 is pivoted with respect to second portion 204. For example, hinge region 201 can include mandrel 218 which can be in the form of a cylinder-like portion of first portion 202 that extends along the pivot axis 206.

When electronic device 200 is moved from a closed state in FIG. 2A to an open state in FIG. 2B, cable 210 is drawn over a curved surface 242 (see FIG. 2C) of mandrel 218 to keep cable 210 from bucking or folding. The curved surface can be referred to as a mandrel surface, a cable support surface, a cable-contacting surface, a cable-facing surface, an outer hinge surface, a cable-bend-limiting surface, or a curved mandrel surface. A portion of the cable 210 can take on a curved shape in accordance with the curved surface of mandrel 218 when electronic device 200 is rotated to an open configuration, as shown in FIG. 2B.

The curved surface of mandrel 218 can have a radius R defined with respect to a pivot axis 206 (i.e., an axis of rotation of the hinge region 201). The radius R can be constant for the curved surface where the cable 210 contacts mandrel 218. Alternatively, the surface of mandrel 218 may have a variable radius where the cable 210 is drawn. See, e.g., FIG. 3 and accompanying description below. In some embodiments, the surface of mandrel 218 is segmented to correspond to sections of the flex cable 210. Different parts of the axial length (i.e., the length extending along, or generally parallel to, the pivot axis 206) of the mandrel surface can have different radii. In some embodiments, the mandrel 218 has an axial length that extends across substantially the entire width of electronic device 200. In some embodiments, the mandrel 218 has a curved surface with continuous curvature, while in other embodiments, mandrel 218 includes substantially flat segments that maintain the cable 210 in a substantially flat configuration at certain sections of the cable 210.

Referring to FIG. 2B, when the electronic device 200 is in an open state, a cover can be used to conceal and protect a top side of cable 210 between the portions 202, 204 at hinge region 201. The surface of the cable 210 contacting the cover 222 can be referred to as a cover-facing surface, a top surface, a user-exposed surface, or a user-viewable surface. That surface is positioned on the cable 210 opposite a mandrel-facing surface of the cable 210. Cover 222 can be flexible, and can therefore, like cable 210, take on a curved shape of the mandrel 218 when electronic device 200 is rotated to an open configuration, as shown in FIG. 2B.

In some embodiments, the radial or curved nature of the surface of mandrel 218 can impart benefits to the flex cable 210 while the electronic device 200 is rotated between the open configuration and the closed configuration. The curved surface design of the mandrel 218 ensures unidirectional bending in the flex cable 210 which can promote maximizing the cycle life and minimizing bending stresses for flex cable 210. The flex cable 210 can be configured to always bend in one direction without inverting backwards (i.e., the flex cable 210 can furl and unfurl in a coiled configuration with the curved surface of mandrel 218 helping to prescribe a minimum bend radius in the hinge region 201). In some embodiments, unidirectional bending can be an optimal configuration for cycle life of the flex cable 210 as opposed to bidirectional or inverse cyclical bending. Furthermore, the curved surface design of mandrel 218 can promote condensing the flex service loop motion into a volumetrically efficient space. Accordingly, the curved surface of mandrel 218 can exert a force on the flex cable 210 to condense it into the cavity 208 of the second portion 204 while avoiding straining the flex cable 210 and while imparting minimal bending stress on the flex cable 210 as it is looped in the cavity 208.

In some embodiments, as the electronic device 200 is rotated between an open state (see FIG. 2B) and a closed state (see FIG. 2A), the flex cable 210 can be bent in only a single direction. In contrast, a flex cable that is designed to bend in multiple directions and is condensed into a volumetrically efficient space (e.g., cavity 208) can impose a greater amount of stress on the furled section of the flex cable 210. Unidirectional bending significantly reduces the amount of stress on the flex cable 210 and promotes greater cycle life.

In some embodiments, the flex cable 210 is described as bending along a single direction or has unidirectional bending. In some embodiments, the direction can refer to the relative position of one point with respect to another point. In some embodiments, the direction can refer to translation of motion where a point (or section) of the flex cable 210 changes position in a three-dimensional space according to an x-coordinate, y-coordinate, and z-coordinate. Using this convention, the positive z-direction points upward in FIG. 2A, the positive Y-direction points into the page in FIG. 2A, and the positive X-direction points to the right in FIG. 2A.

In some embodiments, curvature can refer to an amount by which a point (or a section) of the flex cable deviates from a flat or linear line. For example, while the electronic device transitions from the open state to closed state, an amount of curvature formed along a furled section of the flex cable 210 can increase such that the curvature further deviates from a flat or linear line near the mandrel 218 (as shown in FIG. 2A). Similarly, while the electronic device transitions from the closed state to the open state, an amount of curvature formed along the furled section of the flex cable 210 near electronic component 212 can decrease (as shown in FIG. 2B).

In some embodiments, an amount by which the flex cable 210 bends can be inversely related with the present angle between the first portion 202 and the second portion 204. In some examples, the curved surface of mandrel 218 can exert a greater amount of a bend (in a single direction) on the flex cable 210 when the first portion 202 is pivoted relative to the second portion 204 by an angle of less than 90 degrees in contrast to when the angle between the first portion 202 and the second portion 204 is pivoted to greater than 90 degrees. In other words, as the angle between the first portion 202 and second portion 204 decreases and the electronic device 200 becomes progressively closer to being characterized as having a closed configuration, the amount of bend in a furled section of the flex cable 210 can increase. In some embodiments, the first portion 202 and the second portion 204 can be pivoted relative to each other according to an angle between about 0 degrees to about 200 degrees.

In some embodiments, a section of the flex cable 210 is mechanically captured by the second portion 204. In some embodiments, a section of the flex cable 210 is mechanically captured by the first portion 202. The term mechanically captured can refer to enclosing or containing the section of the flex cable 210 by at least one of an enclosure, a tensioning mechanism, a hook, or a castellation of either the first portion 202 or the second portion 204.

In some embodiments, when the electronic device transitions from the open state to the closed state, the furled section of flex cable 210 mechanically captured by the second portion 204 can furl even more into a coiled configuration. In some embodiments, the amount of bend exerted on a section of the flex cable 210 that is mechanically captured by the first portion 202 can be independent of the amount of bend exerted on a section of the flex cable 210 that is mechanically captured by the second portion 204.

In some embodiments, a section of the flex cable 210 that is mechanically captured by the first portion 202 can be drawn over the curved surface of mandrel 218. As shown in FIG. 2A, the section of the flex cable 210 that is mechanically captured by the first portion 202 can have a generally linear shape in the closed configuration. Subsequent to the electronic device 200 rotating from the closed configuration to the open configuration, the curved surface of mandrel 218 can exert tension on the flex cable 210 so that an increased amount of bend or curvature on this section of the flex cable 210 is formed as the flex cable 210 is drawn over the curved surface of mandrel 218. The flex cable 210 can be imparted to bend in a single direction so that the curve or bend of the flex cable 210 corresponds to the curvature of the curved surface. The curved surface of mandrel 218 has a radius R defined with respect to a pivot axis 206. In some embodiments, the curved surface of mandrel 218 can prescribe a minimal bend radius of the flex cable 210. For example, the mandrel 218 can have a curved surface with a radius of 10 millimeters from the pivot axis 206. Accordingly, the curved surface of mandrel 218 can dictate that the flex cable 210 has a minimum bend radius of at least 10 millimeters or greater while the electronic device 200 is in the open configuration.

Referring to FIG. 2B, a furled section of the cable 210 can be mechanically captured by the second portion 204. As the electronic device 200 transitions from the closed configuration to the open configuration, the amount by which the furled section of the flex cable 210 bends within the second portion 204 can decrease such that the flex cable becomes progressively unfurled. In the open configuration, the curved surface of mandrel 218 and the structural member or support member 214 can cooperate to exert a greater amount of tension on the flex cable 210 such that the amount of bend decreases. For example, one side of the flex cable 210 can be held against a curved surface of the support member 214 in the open configuration. This is in contrast to the closed configuration (see FIG. 2A) wherein that portion of the flex cable 210 is free of contact from (or has significantly less contact with) the curved surface of the support member 214. In some embodiments, the curved surface of support member 214 can reduce an amount of abrasion exerted against the flex cable 210 when the two components come into contact to each other.

Furthermore, FIG. 2B shows that the curved surface design of mandrel 218 can promote condensing the flex service loop motion into the cavity 208. Accordingly, the curved surface of mandrel 218 can exert on the flex cable 210 to be condensed into the cavity 208 of the second portion 204 while avoiding straining the flex cable 210 or imparting minimal bending stress on the flex cable 210 as it is looped into the cavity 208.

In some embodiments, the benefits imposed upon by the curved surface of mandrel 218 on the flex cable 210 can be similarly imposed upon the cover 222, which covers and protects a side of the cable 210 at the hinge region.

First end 222a of cover 222 can be positioned within first portion 202 of electronic device 200 and second end 222b of cover 222 can be positioned within second portion 204 of electronic device. Since cover 222 can be exposed, cover 222 can be made with a material that is durable enough to withstand wear and tear that can be accompanied with direct exposure to a user. For example, cover 222 may encounter objects inserted or dropped within hinge region 201. Cover 222 can also be flexible enough to bend with cable 210 when electronic device 200 transitions between open and closed states. Cover 222 and mandrel 218 can be designed to have a particular aesthetic appearance, such as each having the same or different colors, or each having the same or different surface appearances.

Another consideration in choosing a material for cover 222 is how cover 222 moves during the opening and closing of electronic device 200. For example, cover 222 can have an inherent rigidity and resilience that generates a resistance force when cover 222 is bent over mandrel 218 when electronic device 200 moves from closed (FIG. 2A) to open (FIG. 2B) position. This resistance force can cause cover 222 to return to its original shape when electronic device 200 is returned to a closed (FIG. 2A) position. This way, cover 222 will not crease or buckle at hinge region 201. That is, if cover 222 is made of a material that is not sufficiently rigid, it could crease or crinkle at hinge region 201.

The rigidity of cover 222 can also at least partially dictate the movement of cable 210. For example, the side of cover 222 that is exposed to a user can be constrained near first end 222a by anchor 209 and near second end 222b by retention rib 207. Anchor 209 and retention rib 207 can act as retention features that keep cover 222 from shifting out of place and keep cover 222 over cable 210 when electronic device 200 rotates between closed and open positions. In some embodiments, anchor 209 is made of a stiff material, such as a metal material (e.g., stainless steel). First end 222a can be coupled to anchor 209 using, for example, adhesive and/or fastener(s) such as one or more screws. In some embodiments, retention rib 207 and seal 226 can include a low friction material, such as a fluoropolymer material (e.g., polytetrafluoroethylene or TEFLON™), that allows cover 222 to slide freely during opening and closing of electronic device 200. In other words, second end 222b can be untethered and free to move with respect to cable 210 and seal 226. The second end 222b can therefore be free to slide along the top surface of the cable 210 and within the second housing 205. Retention rib 207 can cooperate with lip 228 (see FIG. 2A) at an inner surface of cavity 208 to retain second end 222b within cavity 208. Lip 228 can be an integrally formed portion of second housing 205, or it can be a separate piece that is coupled to the inner surface of cavity 208, such as part of seal 226.

The cable 210 can move with respect to electronic component 212. For example, during rotation of first portion 202 with respect to second portion 204, movement of cable 210 at connection point 213 to electronic component 212 can be minimized in order to prevent fatiguing of cable 210. Over-bending and fatiguing of cable 210 can cause cable 210 to fail, and connection point 213 can be susceptible to such fatiguing. Thus, isolating features can be used to isolate portions of cable 210 proximate to connection point 213. Such isolating features can include support member 214, which can support cable 210. In some cases, support member 214 is attached to a board that is part of or proximate to electronic component 212. Cable 210 can be routed around support member 214 and clip 216 can be used to secure cable 210 to support member 214 and isolate the length of cable from movement between clip 216 and connection point 213. Support member 214 can have a curved surface that guides the cable 210 as cable 210 is drawn out of the cavity 208.

The non-isolated section of cable 210 extending between clip 216 and retention rib 207 may be free to translate within cavity 208 when first portion 202 is rotated with respect to second portion 204. However, since cable 210 is routed around support member 214, cable 210 maintains a concave curvature, which prevents cable 210 from bending between concave and convex curvatures, and prevents cable 210 from bending below a prescribed radius, thereby reducing fatiguing of cable 210. This wrapped configuration can allow for a relatively large length of the cable 210 for uptake during rotation of electronic device 200 while reducing the stress placed on cable 210. That is, cable 210 can be free to "float" in the cavity 208. In other words, the cable 210 can be configured to be out of contact with any other components along the length of the cable 210 positioned between the support member 214 and the retention rib 207 or cover 222. Another advantage of this wrapped configuration is that this can also reduce a distance between retention rib 207 and wall 234 of second housing 205 required to house cable 210.

In some embodiments, electronic device 200 has ventilation gap 224 suitable for providing air flow in and out of cavity 208 and cooling electronic component 212 and other components housed within cavity 208. Ventilation gap 224 is positioned near hinge region 201 between first portion 202 and second portion 204 of electronic device 200. Depending on cooling requirements, ventilation gap 224 can have a size sufficiently large enough to allow access to components within cavity 208, including the cable 210, when electronic device 200 is in a closed position. Thus, the blocking member 220 (i.e., the vent opening wall or housing barrier) can be used to limit access to cavity 208. Blocking member 220 can an integral part of second housing 205 or a separate piece that is coupled to second housing 205. In some embodiments, blocking member 220 is coupled to an inner surface within cavity 208 proximate ventilation gap 224. Blocking member 220 can have provisions such as through-holes or apertures to allow for further ventilation of cavity 208. As shown, cable 210 can be routed between blocking member 220 and lip 228 as cable 210 exits second housing portion 204.

As described above, the cover 222 should be made of a sufficiently flexible material to allow bending of the cover 222 over the cable 210 and the mandrel 218 during opening of electronic device 200. However, the cover 222 should also be rigid and resilient enough to provide a resistance force to the bending such that the cover 222 returns to its original configuration when electronic device 200 is closed again. For example, the section of cover 222 between pivot axis 206 and retention rib 207 can return to a substantially flat shape when electronic device 200 is returned to a closed state (as shown in FIG. 2A). In some embodiments, cover 222 is non-electrically conductive to prevent cover 222 from electrically interfering with internal components of electronic device 200. In some embodiments, cover 222 is made of a single sheet of material, such as a composite fiber material. For example, cover 222 can be made of a single sheet of glass and/or carbon fiber material embedded within or infused with a polymer, such as polyurethane. In some embodiments, cover 222 is a laminated sheet that includes layers of different materials.

The electronic device 200 can comprise a mandrel 218 having a curved surface that comes into close contact with, or in close proximity to, the mandrel-facing surface of the cable 210 as the device 200 is moved between the open and closed positions. In some instances, the size of the ventilation gap 224 can permit particles or other unwanted foreign material to pass between the first portion 202 and the second portion 204 and become stuck to the curved surface of the mandrel 218, stuck to the cable 210, or lodged between the mandrel 218 and the cable 210. These particles are often hard and angular in a manner that can apply a localized high pressure to the cable 210 that can cause cable 210 failures or other malfunctions, especially when the device 200 is in an open condition and the cable 210 is closely held against the mandrel 218. Accordingly, some embodiments employ a particle relief feature positioned in the hinge region 201 between the hinge/pivot axis and the cable 210 such as a mandrel 218 with a debris relief portion. The particle relief feature can limit damage or disturbance to operation of the electronic device 200 caused by particle ingress between the mandrel 218 and cable 210.

Figure 2C:
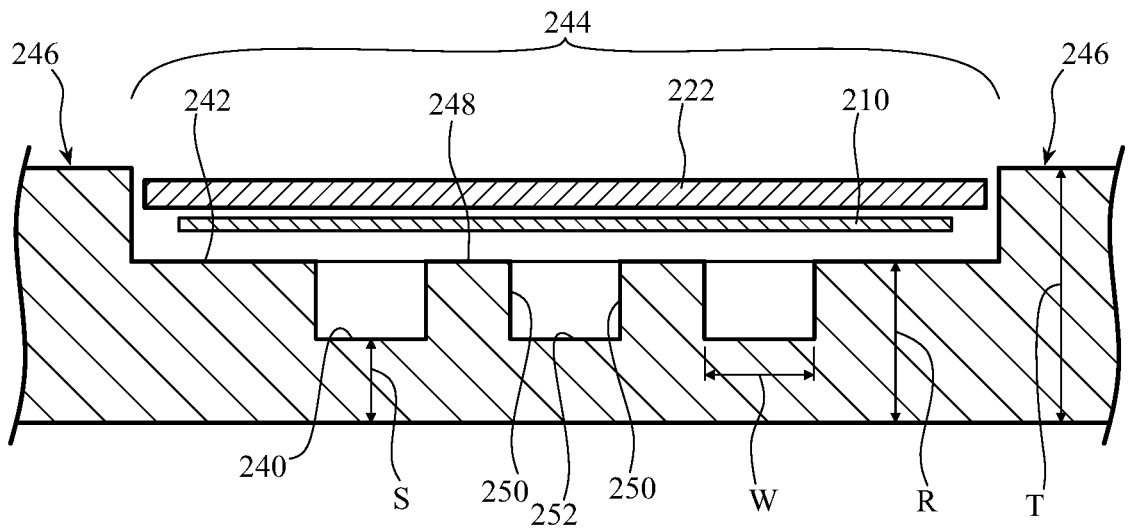
FIG. 2C shows a front section view of the hinge region of FIG. 2A as taken through section lines 2C-2C in FIG. 2A.
Figure 2D:
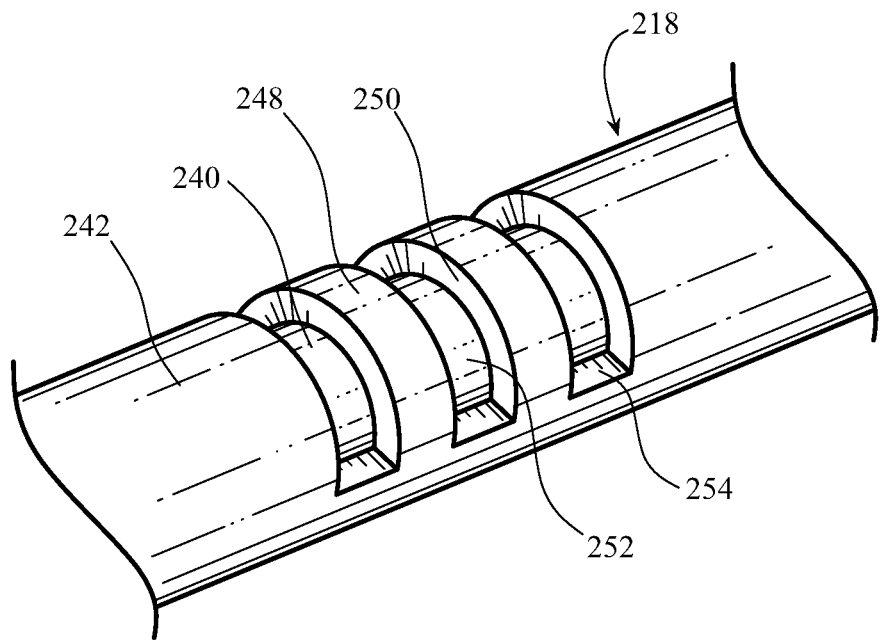
FIG. 2D shows an isometric view of a mandrel of the hinge region of the computing device of FIG. 2A.

In one embodiment, the mandrel 218 comprises at least one channel 240 or groove configured to help capture or expel particles between the mandrel 218 and cable 210. In some embodiments, a set or series of channels can be formed in the mandrel 218 to permit expulsion of particles across a length dimension of the mandrel 218. FIGS. 2A-2D show features of the channels 240. FIG. 2C is a front section view of the cable 210, cover 222, and mandrel 218 as indicated by section lines 2C-2C in FIG. 2A. FIG. 2D is an isometric view of a cable-facing portion of the mandrel 218.

The channels 240 can be recessed into the curved surface 242 of the mandrel 218, wherein the channels 240 each comprise a reduced radius S (as measured from the axis of rotation 206) as compared to the radius R of the adjacent curved surface 242. See FIGS. 2A-2C. FIG. 2C also shows that lateral or uncovered portions 246 of the mandrel 218 can have a greater radius T than the covered portion 244 positioned under the cover 222 or cable 210. The mandrel 218 can comprise multiple covered portions 244, such as, for example, one covered portion 244 for each cable 210 or cover 222 in the electronic device 200.

The channels 240 can be formed along at least one covered portion 244 of the mandrel 218 that is covered or contacted by the cable 210 or cover 222. Portions of the curved surface 242 between the channels 240 (e.g., intermediate portion 248) can have equal radii (e.g., radius R) and surface curvature in a manner that allows them to provide equal support to the cable 210 between the gaps caused by the presence of the channels 240 on the mandrel 218. Thus, the number of channels 240, their individual widths W, and their placement in the covered portion 244 can be configured to be sufficient to receive a predetermined size of particle between the channel 240 and the cable 210 while also being small enough to limit cable sagging or increased pressure against the cable 210 by the intermediate portions (e.g., 248) of the curved surface 242. In some embodiments, three channels 240 are implemented, and in some cases, more or fewer channels can be used. In some embodiments, the width W of the channels 240 can be about equal to the width of the intermediate portions (e.g., 248) of the curved surface 242 as measured parallel to the pivot axis 206.

The channels 240 can have a cross-sectional profile that is roughly rectangular or square, as shown in FIG. 2C. Thus, the channels 240 can comprise two opposing sidewalls 250 that meet at a base surface 252 at right angles. As shown in FIG. 2D, the channels 240 can also comprise a perpendicular end wall 254. Each end of a channel can have an end wall 254. In some arrangements, the cross-sectional profile of each channel 240 can comprise a half-circle, half-ellipse, triangle, or a curved base surface 252. Further, the depth of a channel 240 can taper down or curve to the curved surface 242 rather than forming an end wall 254. A shape profile having any of these characteristics can be selected based on the expected types of particles or other foreign material that the designer expects the surface 242 to encounter. For example, the shape of the channels 240 can be selected to be large enough to prevent static attraction or surface tension from stopping particles or fluid drops of a certain size or composition from exiting the channels 240.

The channels 240 can have a circumferentially-measured length (i.e., an arc length measured relative to the pivot axis 206). This length can be measured along the base surface 252 from a first end wall 254 to an opposite end wall in the same channel 240. The length can extend around at least a portion of the circumferential length of the curved surface 242 of the mandrel 218. As shown in FIGS. 2A-2B in dashed lines, the channels 240 can have a length extending across about a 120 degree arc on the curved surface 242. In some embodiments, an about 90 degree arc, an about 180 degree arc, or an arc extending across an angle between about 60 degrees and about 270 degrees can be used. The length of the arc can be selected to ensure that the channels 240 coincide with portions of the curved surface 242 and cable 210 that are most susceptible to damage or disturbance when a particle is positioned between them. For example, the length of the arc can be selected to cover the entire range of possible contact between the cable 210 and the curved surface 242 or across the entire curved surface 242. The length of the arc can also be proportionally related to the maximum relative rotation between the first and second portions 202, 204. In some embodiments, the channels 240 are configured to be adjacent to the cable 210 and extend away from the cable 210 when the electronic device 300 is in the closed position, as shown in FIG. 2A, since that is a position where particles are more exposed and able to exit the channels 240 through the ventilation gap 224.

A particle passing between the mandrel 218 and the cable 210 can pass into the channels 240 where there is more space between the channel surfaces and the cable 210 rather than being positioned between the curved surface 242 and the cable 210 where it could rub against or otherwise apply pressure to the cable 210. Thus, the channels 240 can form a series of gaps between the mandrel 281 and the cable 210 or cover 222. Additionally, the length of the channels 240 can allow particles in the channel to move circumferentially around the mandrel 218 to fall out of the ventilation gap 224. For example, this particle movement can occur as the first and second portions 202, 204 are rotated relative to each other, as the electronic device 200 is moved and reoriented as a whole, or when a fluid (e.g., compressed air) passes into the channels 240 in a manner that dislodges any particles therein.

Figure 3:
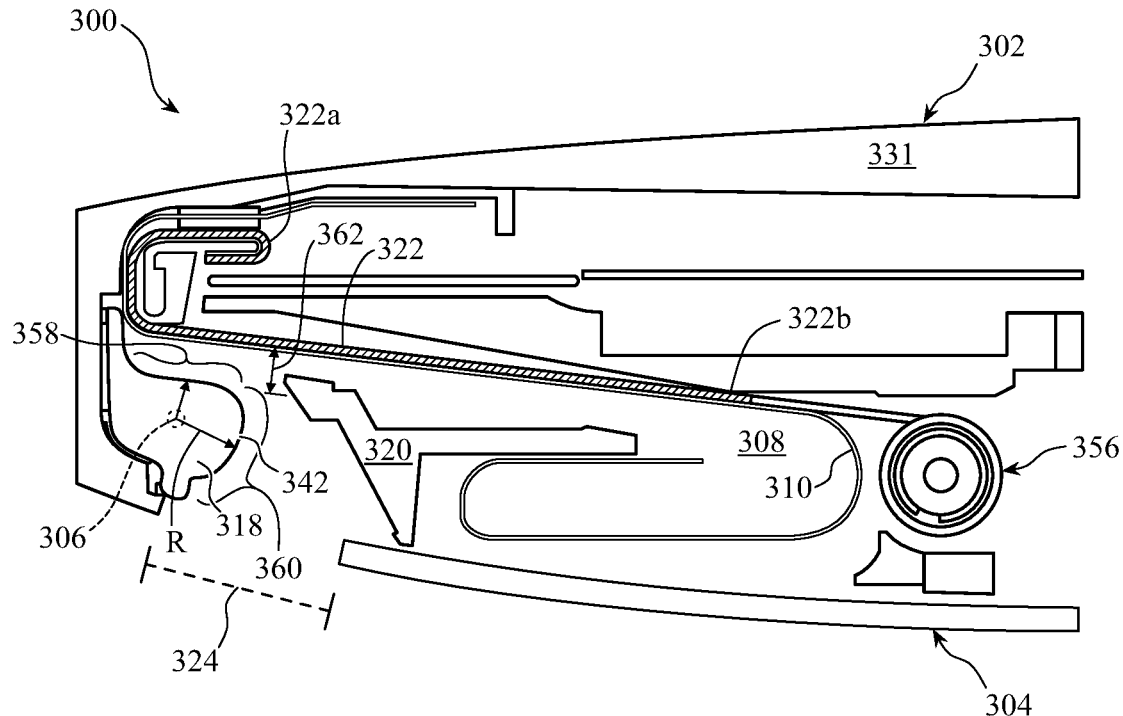
FIG. 3 shows a side section view of an embodiment of a hinge region of a closed computing device.

FIG. 3 shows a side section view of another embodiment of a particle relief system for an electronic device 300. Elements having corresponding numbering in FIGS. 2A and 3 correspond in their features and functions. Some elements have been omitted for clarity. The electronic device 300 can comprise a tensioning mechanism 356 (i.e., a retraction mechanism or tension assistance device) attached to an end 322b of the cover 322. In some embodiments, the end 322b of the cover 322 can be configured to wrap around and be positioned within the tensioning mechanism 356. The tensioning mechanism 356 can comprise a biasing member (e.g., a coil spring) to provide a tension force that keeps the cover 322 in tension. This can be beneficial when the electronic device 300 is transitioning from the open state to a closed state, and the cover 322 is passing into the second portion 304. The force applied to the cover 322 can be oriented in a direction roughly parallel to a flat portion of the cable 310 and into the cavity 308 of the second portion 304. The tensioning mechanism 356 can help prevent bunching, folding, or other unwanted bending of the cover 322 as it moves into the second portion 304. Keeping the cover 322 smooth can also help keep the cable 310 smooth as it moves. A smooth cable 310 can move more predictably and potentially with less pressure against the surface of the mandrel 318. The reduced force between the mandrel 318 and cable 310 can help reduce the chance that a particle between the cable 310 and mandrel 318 will become trapped or cause damage.

In some embodiments, the tension in the tensioning mechanism 356 can be optimized so that it is high enough to ensure the cover 322 retracts smoothly into the second portion 304 while being low enough to not impart undue pressure from the cover 322 to the cable 310. In this manner, if a foreign object is positioned between the cable 310 and the mandrel 318, the tension in the cover 322 is low enough to allow the cable 310 to move slightly away from the mandrel 318 as the mandrel 318 moves, thereby reducing the chance that the foreign object will be trapped in the electronic device 300. Accordingly, a particle relief feature of the electronic device 300 can include a calibrated tensioning mechanism 355 configured to permit displacement of the cable 310 away from the surface of the mandrel 318 while applying a retracting tension to the cover 322.

The mandrel 318 can comprise a curved surface 342 having variable curvature along its circumferential length. As shown in FIG. 3, the pivot axis 306 can be positioned closer to some portions of the curved surface 342 than other portions thereof. When the electronic device 300 is in the closed position, the curved surface 342 can comprise a first circumferential length portion 358 generally facing toward the cable 310 and a second circumferential length portion 360 generally facing in other directions (e.g., parallel to or away from the cable 310). As shown in FIG. 3, the first circumferential length portion 358 can be generally closer to the pivot axis 306 than the second circumferential length portion 360. The curved surface 342 can comprise a reduced radial thickness (i.e., thickness relative to the pivot axis 306) at a first portion as compared to a second portion. A distance between the curved surface 342 and the cable 310 can decrease as the electronic device 300 is opened and can increase as the electronic device 300 is closed.

Accordingly, a gap 362 can be formed between the mandrel 318 and the cable 310 while the electronic device 300 is in a closed configuration. The gap 362 can allow any foreign matter at the mandrel 318 to fall out the ventilation gap 324 or fall away from the cable 310 as the mandrel 318 rotates out of contact with the mandrel-facing surface of the cable 310. As the electronic device 300 is opened, the mandrel 318 can rotate to a position wherein the second circumferential length portion 360 contacts the mandrel-facing surface of the cable 310 and thereby limits the bending radius of cable 310 where it contacts the mandrel 318. The second circumferential length portion 360 can have a radius from the pivot axis 306 equal to the radius R of mandrel 218, and the first circumferential length portion 358 can have one or more radii from the pivot axis 306 less than radius R. Thus, the mandrel 318 can have multiple different radii, including a first radius (directed from pivot axis 306 toward the cable 310) that is smaller than a second radius (R), and the first radius can face the cable 310 when the device 300 is in a closed configuration. The first radius can be referred to as being a reduced radius portion of the curved surface 342 of mandrel 318.

The curved surface 342 having variable curvature can extend along a length of the pivot axis 306. For example, the curved surface 342 can extend along a portion of the mandrel 318 covered by the cable 310 or cover 322 (e.g., similar to portion 244). Other portions of the outer surface of the mandrel can have a different curvature or surface profile (e.g., similar to portions 246). In some embodiments, the curved surface 342 can comprise a section having consistent or non-varied curvature (e.g., similar to intermediate portion 248) and at least one additional section having the inconsistent curvature shown in FIG. 3. For example, a base surface of a channel or groove in the mandrel 318 (e.g., similar to base surface 252) can have the variable curvature profile of curved surface 342.

Figure 4:
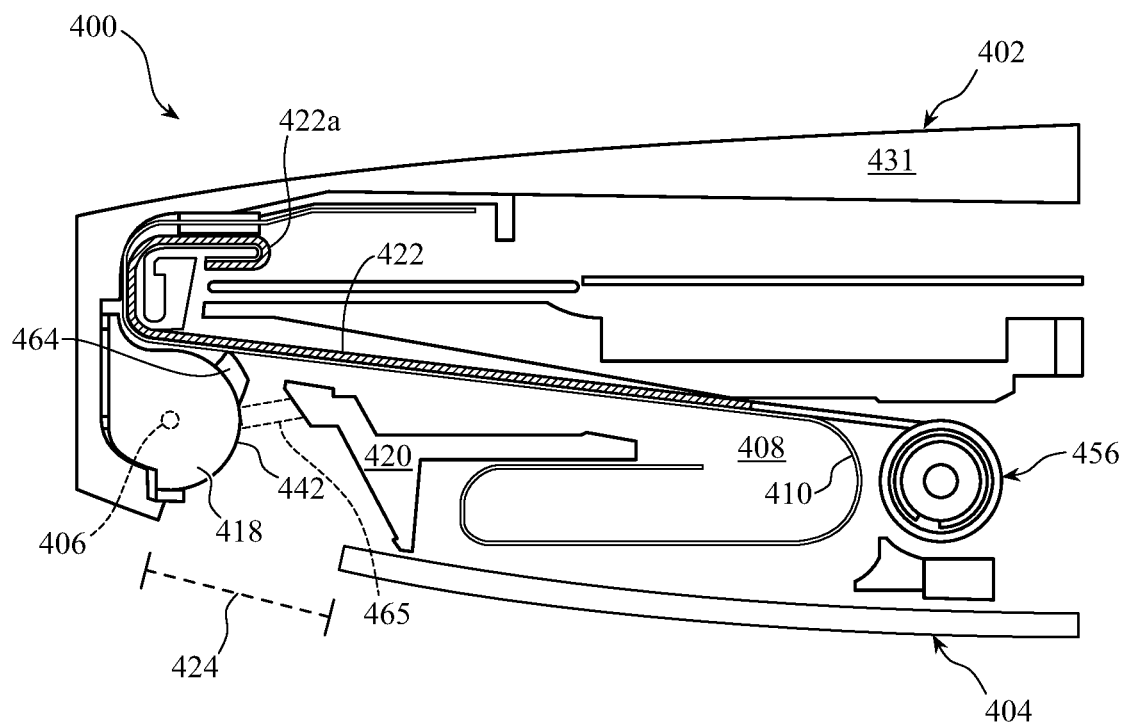
FIG. 4 shows a side section view of an embodiment of a hinge region of a closed computing device.

FIG. 4 shows a side section view of another embodiment of an electronic device 400. Elements having corresponding numbering in FIGS. 2A, 3, and 4 correspond in their features and functions. Some elements have been omitted for clarity. In this embodiment, the mandrel 418 has a curved surface contacting a barrier 464. The barrier 464 can be positioned on the curved surface 442 where the body of the barrier 464 extends radially away from the curved surface 442 between the mandrel 418 and the cable 410 when the electronic device 400 is in the closed configuration (as shown in FIG. 4). Due to the size and positioning of the barrier 464, it can physically block movement of a particle that enters the ventilation gap 424 from passing into a crevice between the mandrel 418 and the cable 410.

The barrier 464 can move with the rotation of the mandrel 418. Accordingly, the barrier 464 can be between the mandrel 418 and the cable 410 as the electronic device 400 is opened. The barrier 464 can therefore comprise an elastically compressible material such as a light foam. Due to having high compressibility, the barrier 464 can be configured to exert minimal pressure on the cable 410 as when it is compressed between the cable 210 and the mandrel 418. As the mandrel 418 moves, the barrier 464 can remain in contact with the mandrel 418 and with the cable 410 throughout its cycle of movement, thereby ensuring that no gaps form between the barrier 464 and the cable 410 or between the barrier 464 and the mandrel 418.

In various embodiments, the barrier 464 can be attached to the mandrel 418, the cable 410, or the blocking member 420. For example, the barrier 464 can be attached to the cable 410 at the position shown in FIG. 4. In some embodiments, a barrier can be positioned between the curved surface 442 and the blocking member 420 (i.e., housing wall), as shown in broken lines as barrier 465. In this manner, the barrier 465 can provide a seal that prevents ingress of debris past the blocking member 420 (e.g., into cavity 408) as well as preventing passage of debris between the mandrel 418 and the cable 410, at least while the electronic device 400 is in the closed position. In some embodiments, the barrier 464/465 can be configured to brush, wipe, or sweep debris on the curved surface 442 or the cable 410 as the mandrel 418 turns so that the debris does not pass deeper into the electronic device 200. The barrier 464/465 can slide against curved surface 442.

Figure 5A:
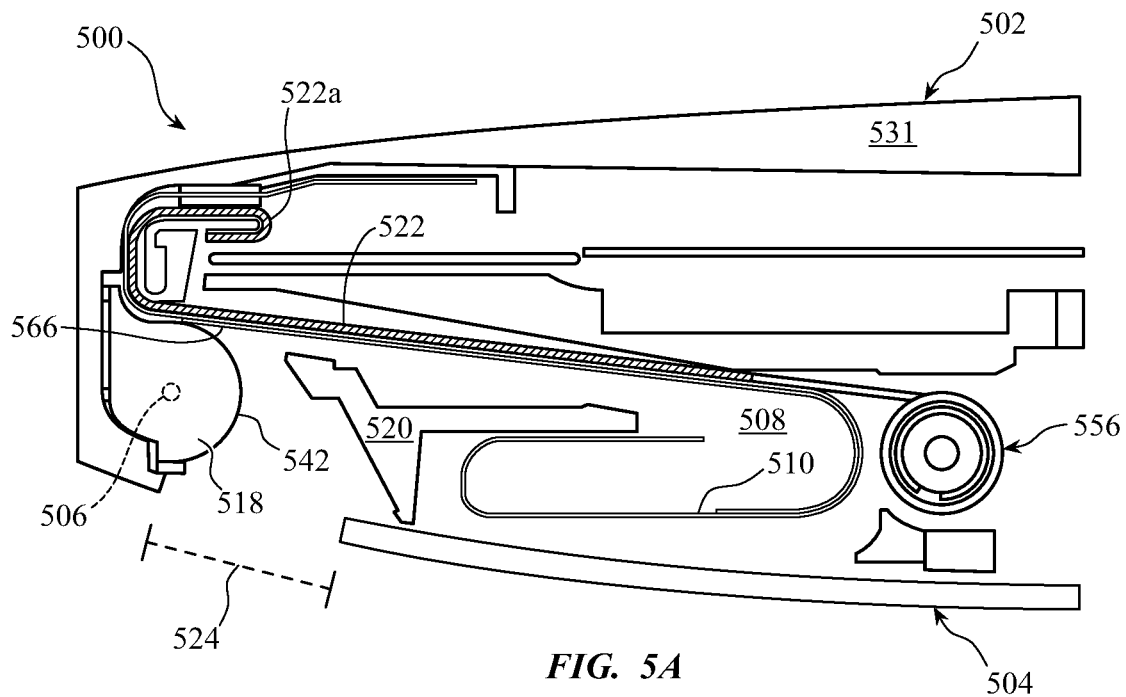
FIG. 5A shows a side section view of an embodiment of a hinge region of a closed computing device.

FIG. 5A is a side section view of another embodiment of an electronic device 500. Elements having corresponding numbering in FIGS. 2A, 3, 4, and 5 correspond in their features and functions. Some elements have been omitted for clarity. In this case, the cable 510 can comprise a protective layer 566 configured to contact the mandrel 518 and to face the ventilation gap 524. The protective layer 566 can therefore be positioned on the cable 510 opposite the cover 522. The protective layer 566 generally faces in a downward direction near the mandrel 518 as compared to the upward-facing orientation of the cover 522. The protective layer 566 can extend along at least a portion of the overall length of the mandrel-facing side of the cable 510. As used herein, the curved surface 542 of the mandrel 518 "touches" or "is in contact with" the cable 510 when it contacts a layer covering and moving with the cable 510, including protective layer 566, which covers and moves with the cable 510.

The protective layer 566 can reinforce and strengthen the cable 510. For example, the protective layer 566 can comprise a durable material (e.g., rubber or plastic) that is resilient against pressure applied by small, hard particles (e.g., sand or salt grains). Therefore, when debris passes between the mandrel 518 and the protective layer 566, the protective layer 566 can absorb and distribute the pressure applied by the debris to either prevent the cable 510 from being locally bent by the debris or to enlarge the area of deformation caused by the debris so that the area as a whole encounters less concentrated pressure (and associated deformation) than if the protective layer 566 were omitted.

In some embodiments, the mandrel 518 can comprise a durable or compressible material. For example, the curved surface 542 of the mandrel 518 can be compressible in a radially inward direction. Thus, a particle between the mandrel 518 and the cable 510 can be accommodated by compression of the mandrel 518 and thereby can apply a reduced pressure or less deformation to the cable 510. In some embodiments, the protective layer 566 and curved surface 542 are both compressible to provide additional flexibility and pressure/deformation reduction.

The protective layer 566 can be configured to help expel debris positioned between the cable 510 and the mandrel 518. In some embodiments, the protective layer 566 can have a series of grooves and ridges extending parallel to the pivot axis 506, as shown in the isometric view of the mandrel-facing surface 568 of the protective layer 566 and cable 510 shown in FIG. 5B. The grooves 570 and ridges 572 can alternate along at least portions of the length of the protective layer 566. A particle passing between the mandrel-facing surface 568 and the mandrel 518 can be caught in one of the grooves 570 or blocked by one of the adjacent ridges 572 rather than passing deeper into the crevice between the mandrel 518 and the cable 510 as the electronic device 500 is operated. Additionally, the curvature of the protective layer 566 can change as it moves against and away from the curved surface 542 in a manner that can help break loose particles contacting protective layer 566, particularly if they are being held in place by a groove 570 and adjacent ridges 572. A small gap can be preserved between the protective layer 566 and the curved surface 542 to permit larger particles to be rolled off of the curved surface 542 by the movement of the protective layer 566.

Figure 5B:
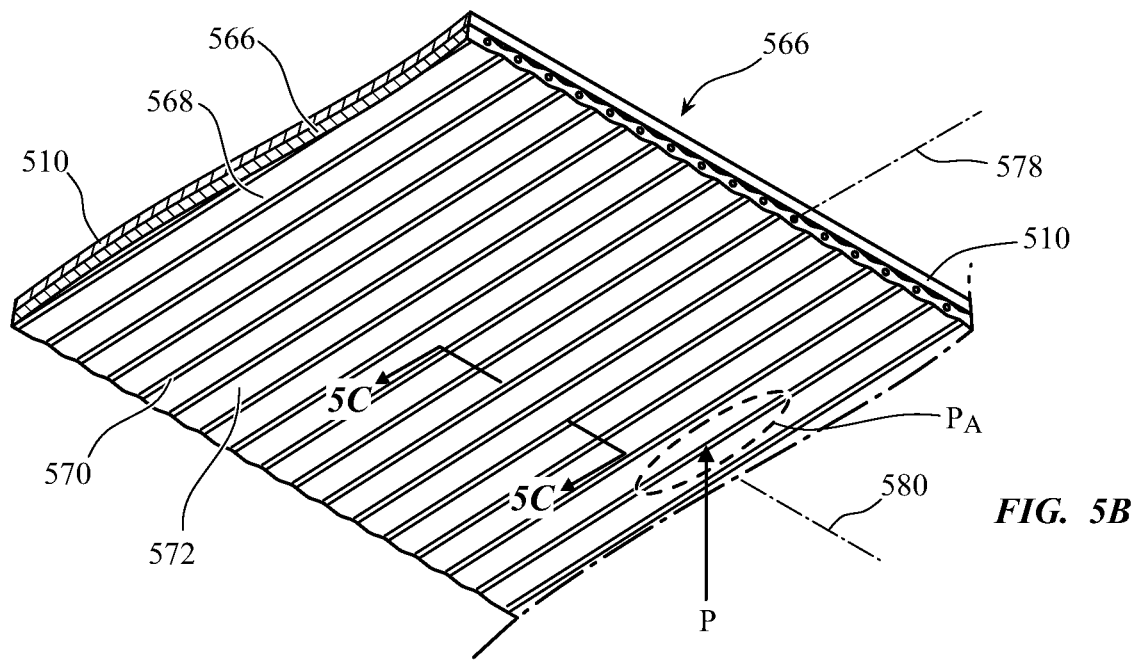
FIG. 5B shows an isometric view of a protective layer of the computing device of FIG. 5A.
Figure 5C:
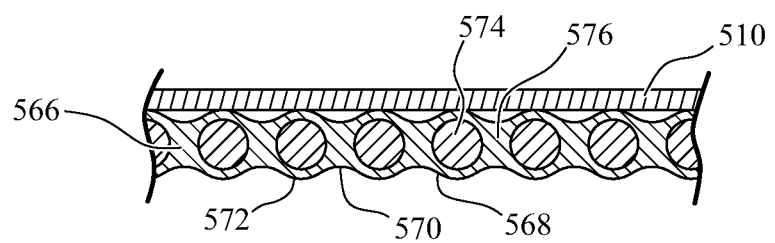
FIG. 5C shows a side section view of the protective layer of the computing device of FIG. 5A as taken through section lines 5C-5C in FIG. 5B.

The protective layer 566 can also comprise structural reinforcements and directional rigidity. As shown in the side section view of FIG. 5C, which is taken from section lines 5C-5C in FIG. 5B, a set of reinforcement fibers 574 can extend through the protective layer 566. The reinforcement fibers 574 can be positioned within a more flexible and bendable connective material 576. The reinforcement fibers 574 can be unidirectional aligned, having lengths extending substantially parallel to the pivot axis 506 of the electronic device 500. In this manner, the protective layer 566 can have increased resistance to bending along the axes of the reinforcement fibers 574 while the connective material 576 still allows the protective layer 566 to bend around the pivot axis 506. In other words, as shown in FIG. 5B, the protective layer 566 can have significantly more flexibility in bending about an axis 578 parallel to the reinforcement fibers 574 as compared to bending about an axis 580 perpendicular to the reinforcement fibers 574. The protective layer 566 can therefore be referred to as having a "bamboo roller"-like flexibility profile. With this flexibility profile, when a particle applies a concentrated pressure P to a small area on the bottom of the protective layer 566 (see FIG. 5B), the pressure P can deform the protective layer 566 across a greater length along a direction parallel to axis 578 more than along axis 580, as indicated by region PA. Thus, the pressure P is distributed across a wider surface area of the cable 510 than if no protective layer 566 were implemented, but the protective layer 566 is still highly pliable while bending around the mandrel 518. The material of the protective layer 566 can therefore be referred to as being relatively rigid in bending along a width dimension of the cable 510 (e.g., along the pivot axis 506) and being relatively flexible in bending along a length dimension of the cable 510 (e.g., across FIG. 5A). The protective layer 566 can also be referred to as a barrier attached to the cable 510 or as a barrier layer of the cable 510.

Increasing the surface area of deformation caused by concentrated pressure P in this manner can help limit damage to the cable 510 or limit how much the pressure P impedes the movement of the cable 510. Also, the reinforcement fibers 574 can all be parallel to the pivot axis 506 rather than some fibers being parallel to axis 580 so that the protective layer 566 can bend more freely as it wraps against the mandrel 518.

In some embodiments, a protective layer 566 can comprise sets of reinforcement fibers that extend parallel to both axes 578, 580 and perpendicular to each other. For example, the fibers can be in a substantially perpendicular configuration such as a weave or lattice pattern. In this case, the fibers can spread deformation caused by a concentrated pressure P to an even larger area. This crossed-fiber configuration can be beneficial for parts of the protective layer 566 that are subjected to less bending than others, such as parts of the protective layer 566 that do not come into contact with the mandrel 518 as the electronic device 500 is opened and closed.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A portable computing device, comprising:
   an upper housing portion containing a first electronic component, the upper housing portion having a curved surface;
   a lower housing portion pivotally connected to the upper housing portion, the lower housing portion containing a second electronic component, the upper and lower housing portions configured to pivot relative to each other between an open position and a closed position;
   a cable connecting the first and second electronic components, the cable configured to bend over and contact the curved surface when the upper and lower housing portions are in the open position; and
   a particle relief feature positioned between the curved surface and the cable, the particle relief feature comprising at least one channel having a curved floor, the particle relief feature configured to reduce pressure applied to the cable by a particle positioned between the cable and the curved surface.

2. The portable computing device of claim 1, wherein the at least one channel comprises a set of channels recessed into the curved surface.

3. The portable computing device of claim 1, wherein the particle relief feature further comprises a gap between the curved surface and the cable when the upper and lower housing portions are in the closed position.

4. The portable computing device of claim 1, further comprising a barrier contacting the curved surface.

5. The portable computing device of claim 4, wherein the barrier is rotatable with the curved surface.

6. The portable computing device of claim 4, wherein the barrier is configured to slide against the curved surface as the upper and lower housing portions are pivoted between the open and closed positions.

7. The portable computing device of claim 1, further comprising a protective layer positioned between the cable and the curved surface comprising a material that is relatively rigid in bending along a width dimension of the cable and that is relatively flexible in bending along a length dimension of the cable.

8. A laptop computer, comprising:
   a housing having a display portion and a base portion, at least one of the display and base portions having a mandrel surface;
   an electronic display in the display portion of the housing;
   a set of computing components in the base portion of the housing; and
   a cable connecting the set of computing components and extending between the electronic display and the set of computing components, the cable bending over the mandrel surface when the display portion and the base portion are in an open position, the mandrel surface being at least partially spaced away from the cable when the display portion and the base portion are in a closed position;
   the mandrel surface comprising:
      a covered portion configured to be covered by the cable and having a first radius, the covered portion comprising at least one channel having a floor at a second radius; and
      an uncovered portion having a third radius, the third radius being greater than either the first radius or the second radius.

9. The laptop computer of claim 8, wherein the at least one channel comprises a set of channels, wherein the mandrel surface is at least partially spaced away from the cable within one of the channels of the set of channels.

10. The laptop computer of claim 8, wherein the set of channels are oriented parallel to a length dimension of the cable.

11. The laptop computer of claim 8, wherein the first radius, the second radius and the third radius are measured from a mandrel surface pivot axis.

12. The laptop computer of claim 8, wherein the mandrel surface at least partially touches the cable when the display portion and the base portion are in the open position.

13. The laptop computer of claim 8, wherein the mandrel surface is at least partially spaced away from the cable when the display portion and the base portion are in a closed position.

14. A computing device, comprising:
a first housing assembly having a mandrel, the mandrel having a curved surface;
a second housing assembly movably connected to the first housing assembly;
a cable extending between the first and second housing assemblies, the cable configured to at least partially wrap around the curved surface as the first housing and the second housing move relative to each other;
wherein the mandrel comprises a debris relief portion to block or capture debris between the curved surface and the cable, the debris relief portion comprising a circumferential groove having a curved floor.

15. The computing device of claim 14, wherein the debris relief portion comprises a convex recess in the mandrel to collect debris between the mandrel and the cable.

16. The computing device of claim 14, wherein the debris relief portion comprises a reduced radius portion of the curved surface.

17. The computing device of claim 14, further comprising a compressible barrier extending from the curved surface.

18. The computing device of claim 14, further comprising a protective layer configured to primarily distribute force concentrations caused by debris positioned between the curved surface and the cable along a distribution axis, the distribution axis being parallel to an axis of rotation of the first housing assembly relative to the second housing assembly.

* * * * *